Dec. 10, 1963  W. HAMILTON  3,113,613
HATCH COVER SYSTEM
Filed Nov. 17, 1960  2 Sheets-Sheet 1

INVENTOR.
WALLACE HAMILTON
BY
RICHEY, McNENNY & FARRINGTON
Donald W. Farrington
ATTORNEYS

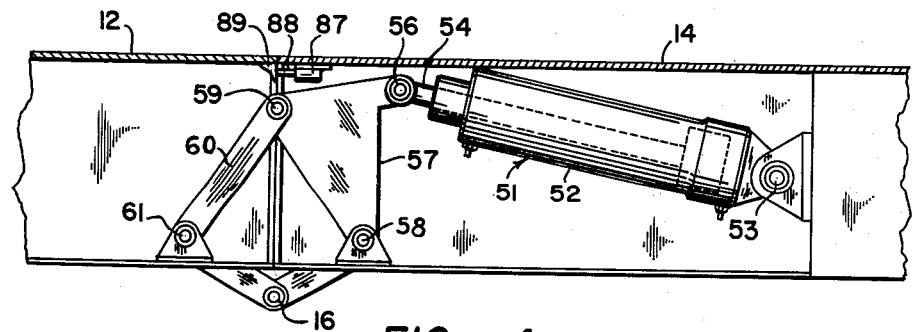
FIG. 4
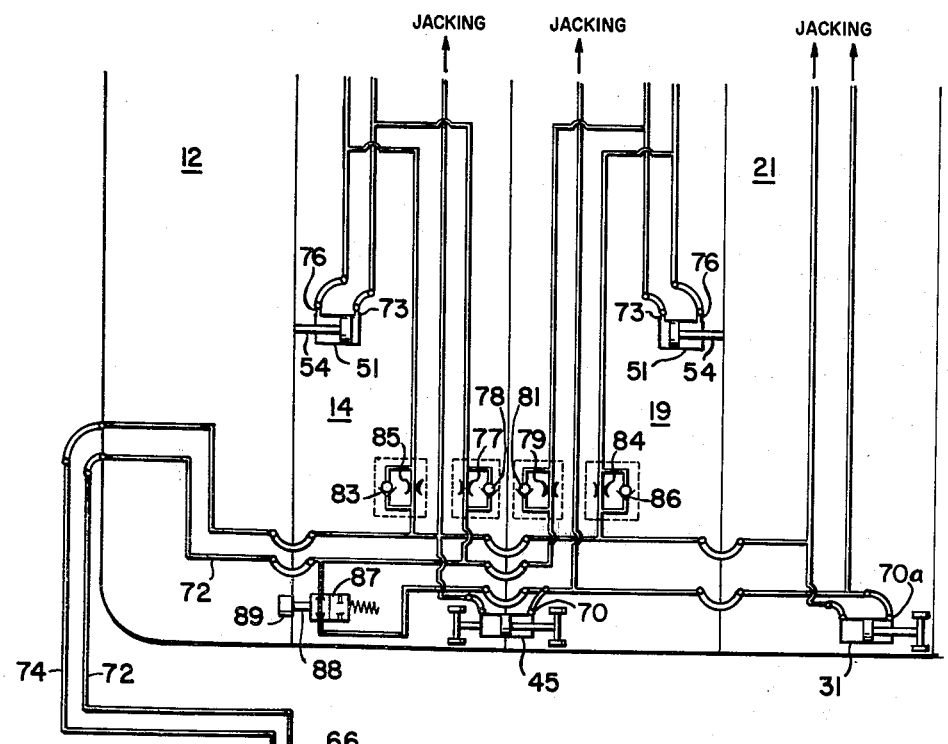
FIG. 5
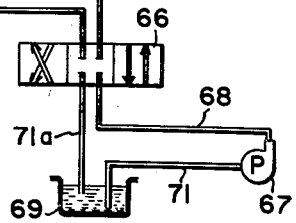
INVENTOR.
WALLACE HAMILTON
BY
RICHEY, McNENNY & FARRINGTON
Donald W. Farrington
ATTORNEYS

United States Patent Office 3,113,613
Patented Dec. 10, 1963

3,113,613
HATCH COVER SYSTEM
Wallace Hamilton, Bentleyville, Ohio, assignor to Pneumo Dynamics Corporation, Cleveland, Ohio, a corporation of Delaware
Filed Nov. 17, 1960, Ser. No. 69,845
5 Claims. (Cl. 160—188)

This invention relates generally to power operated hatch cover systems adapted to cover hatchways of ships and the like and more particularly to a new and improved hydraulic actuating and control system for such hatch covers.

It is an important object of this invention to provide a new and improved hatch cover operating system which automatically sequences the opening and closing hatch cover operations.

It is another important object of this invention to provide a control system for hydraulically operated hatch covers having jacking means which automatically insures that the hatch covers are properly jacked while they are opened or closed.

It is another important object of this invention to provide a new and improved hatch cover system having hydraulically operated jacking and actuation means which are operated through the proper sequence by a single control valve.

It is another important object of this invention to provide a control system for hydraulically operated hatch covers incorporating power jacking means automatically maintained in the jacked position when the cover is in any position other than the extended position.

Further objects and advantages will appear from the following description and drawings wherein:

FIGURE 4 is an enlarged fragmentary side elevation of the actuating mechanism used to power the hatch cover in its movement between the opened and closed positions; and FIGURE 5 is a schematic illustration of the hydraulic circuit used to control the hatch cover mechanism.

Figure 1:
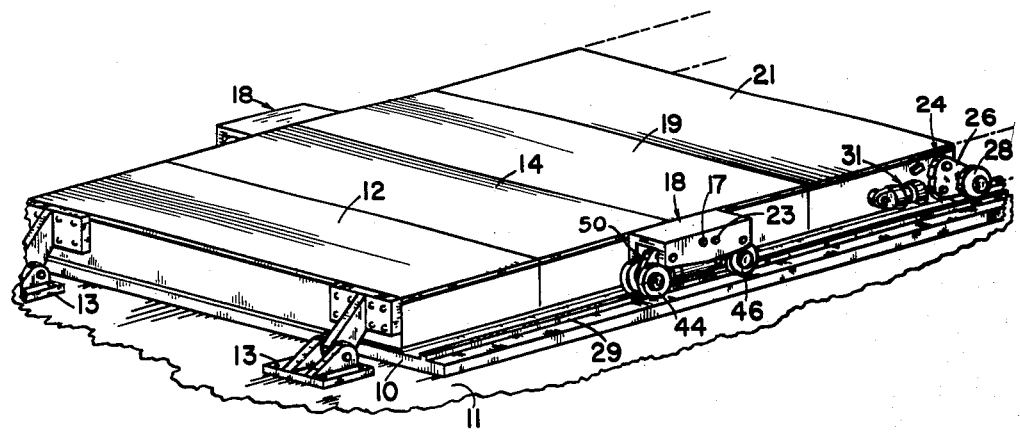
FIGURE 1 is a perspective view of a typical multi-pontoon hatch cover system of the type to which this invention is particular suited.

The preferred embodiment of this invention is illustrated in combination with a hydraulically operated hatch cover jacking system of the type disclosed and claimed in the U.S. patent to Jack Lovell, No. 2,949,091, dated August 16, 1960, which is operated by hydraulic actuators to power the hatch cover between the open and closed position. The actuation mechanism illustrated in the drawings is the type disclosed and claimed in the U.S. patent to Joseph E. Hannigan, Patent No. 2,906,324, dated September 29, 1959. It should be understood, however, that other operators could be used to provide the mechanical force for jacking and operating the hatch covers and that this invention is not limited to the specific hydraulic power mechanisms excepting insofar as they are defined in the claims.

In FIGURE 1 a hatchway is shown schematically which includes a coaming 10 around a hatchway on the deck 11 of a ship. A first pontoon 12 is connected adjacent to one end of the hatchway by a pair of hinges 13 and pivotally connected by a hinge 16 along its opposite edge to a second pontoon 14. The hinge 16 between the pontoons 12 and 14 only appear in FIGURES 3 and 4 because the hinges are below the surface of the pontoons when the hatch cover is closed. The opposite edge of the pontoon 14 is in turn pivotally connected by a pivot 17 to a jacking truck assembly 118 on either side of the hatch cover. Third and fourth pontoons 19 and 21 are pivotally connected to each other at their adjacent edges by a hinge 22 shown in FIGURE 3. The opposite edge of the third pontoon 19 is pivotally connected to the trucks 18 by a pivot 23 and the opposite edge of the fourth pontoon 21 is provided with an outboard jacking assembly 24 on either side of the hatch cover. Only one outboard jack assembly 24 appears in the drawings, but it should be understood that a similar assembly is provided on the far side of the hatch cover which has a structure identical with the one illustrated in the drawings.

Figure 2:
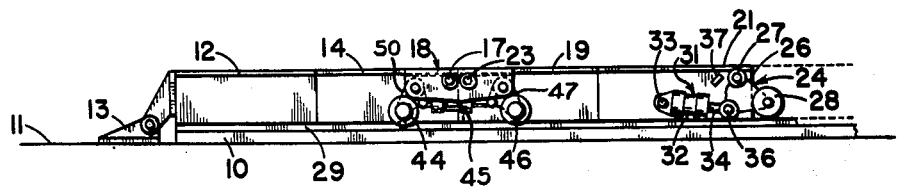
FIGURE 2 is a side elevation illustrating the hatch cover in the extended position wherein it covers the hatchway.
Figure 3:
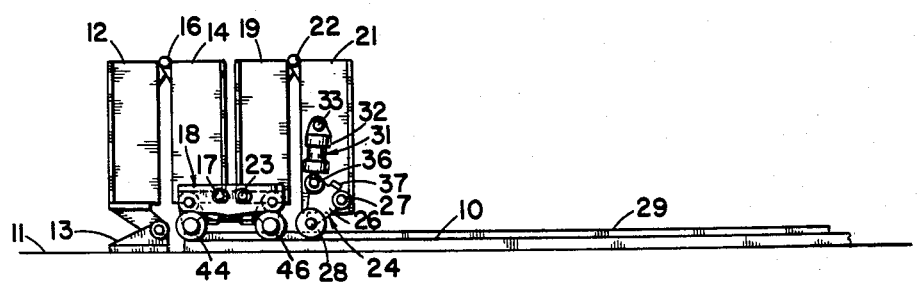
FIGURE 3 is a side elevation similar to FIGURE 2 showing the position the elements assume when the hatch cover is in the open or folded position.

When the hatch cover is in the extended or closed position of FIGURE 2, the pontoons rest on the coaming 10 and are not supported by the trucks or outboard jacking devices 18 and 24. Prior to the opening of the hatch cover, the truck and outboard jacking assemblies 18 and 24 are operated to raise the pontoons off of the coaming 10. Thereafter, the actuating mechanism is operated to cause the panels to fold to one end of the coaming 10 as illustrated in FIGURE 3. Conversely, when the hatch covers close, the assemblies remain in the jacking position until after the hatch cover is extended.

The truck type jacking assemblies 18 include rollers 44 and 46 which roll along the tracks 29 which extend along the sides of the coaming 10. The rollers 44 and 46 are supported on links 50 and 47 respectively, which are in turn pivoted to the truck assembly 18 for movement between an unjacked position of FIGURE 2 and a jacked position of FIGURE 3. The links 50 and 47 are also connected to a hydraulic jacking motor 45 which operates to rotate the links about their respective pivots to either jack or unjack the truck assembly. The various elements are proportioned so that rotation of the link 50 supporting the roller 44 in a counterclockwise direction as viewed in FIGURE 2, and rotation of the link 47 supporting the roller 46 in a clockwise direction raises the truck assembly 18 relative to the track 29, thus, vertically lifting the pontoons to the jacked position. Stops may be provided to limit rotation of the links 50 and 47 in the jacked position.

Preferably, the fluid motor 45 is a double acting piston and cylinder type motor. Pressurization of one port while the other is connected to the exhaust causes the piston to withdraw into the cylinder and operates to raise or jack the truck assembly. Reversal of the fluid flow will extend the piston and lower the truck assembly to the unjacked position.

Each of the outboard jacking assemblies 24 includes a roller 28 also movable along the tracks 29. The roller 28 is supported on a link 26 pivoted on the pontoon 21 at 27. A fluid motor 31 includes a cylinder 32 pivoted at 33 on the pontoon 21 and a piston 34 pivoted at 36 on the link 26. Here again, the elements are arranged so that when the fluid motor 31 is pressurized to cause the piston 34 to move into the cylinder 32, the link 24 is rotated in a direction which causes the roller 28 to move downwardly relative to the pivot 27 and as a result raise the pontoon 21 relative to the coaming.

When the truck and outboard jacking assemblies 18 and 24 are operated to the jacked position, the entire weight of the pontoons is supported directly on the track 29 and hinge 13. At this time the pontoons are clear of the coaming and any water tight seals which may be provided, so that the pontoons are free to move to the folded position of FIGURE 3.

In order to provide the power for operating the pontoons between the extended position of FIGURE 2 and the folded position of FIGURE 3, an actuating mechanism of the type shown in FIGURE 4 is preferred. This mechanism which is clearly described in the U.S. patent to Hannigan cited above includes a piston and cylinder fluid motor 51 with a cylinder 52 pivoted at 53 on the pontoon 14. The piston 54 is pivotally connected at 56 to a link 57 which is in turn pivoted at 58 on the pontoon 14. Extension of the piston 54 under the influence of fluid under pressure therefore rotates the link 57 in a counter-clockwise direction about pivot 58 as viewed in FIGURE 4. A second link 60 is pivoted at 59 to the link 57 and at 61 to the pontoon 12. The two links 57 and 60 cooperate with the hinge 16 to form a four bar linkage wherein relative pontoon rotation can be produced around the axis of the hinge 16 through 180° with a simple piston and cylinder type actuator.

Several actuator systems of the type shown in FIGURE 4 normally are mounted at spaced points along the axis of the hinge 16 to provide the required amount of power for actuating the pontoons between their extended and folded positions. The actuators 51 along each hinge line are connected in parallel for unit operation and all of the actuators 51 are connected in a single control valve so that they will operate simultaneously.

In the operation of a hatch cover incorporating this invention, it is necessary for the jacking operation to be completed before the pontoons are moved from the extended position. This eliminates sliding friction and prevents damage to the watertight seals provided on the weather deck covers. The control system is also arranged to prevent unjacking until the pontoons reach the fully extended or closed position.

To provide the control to meet the above requirements, a hydraulic control system of the type schematically illustrated in FIGURE 5 is used. This control system is arranged so that the entire operation of the hydraulic hatch cover can be controlled by a single valve. This single valve is preferably a three position four-way valve schematically illustrated at 66 in FIGURE 5. When the valve is shifted to the left, the proper hydraulic connections are made to open the hatch cover and when the valve is shifted to the right, the hydraulic connections are reversed to cause the hatch cover to be closed. In the neutral position the valve 66 isolates the hatch cover hydraulic system from the pump and reservoir return. A pump 67, driven by any suitable power source, is connected to the control valve 66 by a pressure line 68 and is supplied from a reservoir 69 through a hydraulic line 71. A reservoir return line 71a connects between the control valve 66 and the reservoir 69.

One of the control ports of the control valve 66 is connected through pressure lines 72 to the rearward port 73 of each of the actuators 51. The other control port of the control valve 66 is connected through a pressure line 74 to the forward port 76 of each of the actuators 51. Thus, when the control valve 66 is shifted to the left, the pressure line 72 is pressurized and the line 74 is connected to the reservoir return. This causes each of the pistons 54 of the actuators 51 to be extended to open the hatch cover. Conversely, when the control valve 66 is shifted to the right, the opposite fluid connections are made and the pistons 54 of the actuators 51 retract to cause the hatch cover to move toward the extended or closed position.

In order to provide rate control, the pressure line 72 is connected to the actuators 51 on the pontoons 12 and 14 through an orifice 77 and a back check valve 78 connected in parallel with the orifice 77. The back check valve 78 is arranged so that it operates to bypass the orifice 77 when the pressure line 72 is pressurized to open the hatch cover, but to close and cause flow through the orifice 77 when the pressure line 72 is connected to the reservoir return and the hatch cover is closing. A similar orifice 79 and back check valve 81 is connected in the pressure line 72 to control the flow to the rearward ports 73 of the actuators 51 on the pontoons 19 and 21.

Here again, the check valve is arranged to bypass the orifice 79 when the pistons 54 are extending to open the hatch covers and to require flow through the orifices 81 when the hatch cover is moving to the closed position.

The pressure line 74 is provided with an orifice 85 and back check 83 in the flow path of the forward port 76 of all of the actuators 51 on the pontoons 12 and 14 and an orifice 84 and back check valve 86 in the line connecting the forward ports 76 of the actuators 51 on the pontoons 19 and 21. Here again, the back check valves 83 and 86 are connected to bypass the corresponding orifices 85 and 84 respectively when the pressure line 74 is pressurized and to require flow through the orifices 85 and 84 when the pressure line 74 is connected to reservoir return. This system of orifices and back check valves is used to control the rate of hatch cover movement.

When the pressure line 72 is pressurized and the line 74 is connected to reservoir return, which is the condition for the opening operation of the hatch cover, the check valves 78 and 81 bypass the orifices 77 and 79 and the orifices 85 and 84 throttle the exhaust flow from the associated actuators 51 to control their rate of operation. Conversely, when the pressure line 74 is pressurized and the pressure line 72 is connected to the reservoir return, the check valves 83 and 86 bypass the orifices 85 and 84 and the orifices 77 and 79 control the rate of exhaust flow from the actuators 51 and in turn the rate of movement of the hatch cover toward the extended position.

The pressure line 72 is also connected to the forward ports 70 and 70a, respectively, of the jacking motors 45 and 31 through a shut-off valve 87. The shut-off valve 87 is mounted on the pontoon 14 as illustrated in FIGURE 4 and is provided with an operator 88 engageable with a stop 89 on the pontoon 12 when the hatch cover is in its extended or closed position. The shut-off valve 87 is spring-biased to the off position in which it isolates the connection with the pressure line 72 from the forward ports of the jacking motors 45 and 31 whenever the panels 12 and 14 are in any position other than the extended position, but provides fluid communication between the pressure line 72 and the two jacking motors when the pontoons 12 and 14 are in the extended position. The pressure line 74 is in turn connected to the rearward end of each of the jacking motors 45 and 31.

Whenever the pressure lines pass through a movable joint such as those at the hinge 13 and the various other hinges connecting the pontoons, flexible lines are used. Similarly, flexible lines connect to the jacking motors 45 and 31 and the actuating motors 51.

The jacking motors 45 and 31 are sized so that their pistons will retract to produce jacking when the pressure in the pressure line 72 is in the order of 200 to 300 p.s.i. The actuation fluid motors 51, however, are sized so that they will not operate to open the hatch cover until the presure within the pressure line 72 reaches a value in the order of 1,000 p.s.i. Therefore, when the control valve 66 is shifted to the left to open the hatch cover, the jacking fluid motors 45 and 31 will be operated to their fully jacked position before the actuators 51 start to operate. It should be understood that the pressure values recited above have been found practical, but are not necessarily critical so long as the jacking motors are sized to operate at a pressure substantially lower than the pressure required to operate the actuating motors. Once the jacking motors have bottomed out at the completion of the jacking operation, the pressure within the pressure line 72 will build up until sufficient pressure is present to operate the actuating motors 51. As soon as the pontoons 12 and 14 move away from the extended position, the shut-off valve 87 operates to isolate the forward ends of the jacking motors 45 and 31 so that they are hydraulically locked in the jacked position until the pontoons return to the extended or closed position. This automatically prevents the jacking motors 45 and 31 from moving to their unjacked condition when the pressure line 74 is pressurized to initiate closing of the hatch cover. As soon as the pontoons 12 and 14 reach the extended position, however, the shut-off valve 87 provides the necessary connection between the pressure line 72 and the forward ends of the jacking motors 31 to exhaust the motors and permit their movement to the unjacked position, thus, completing the closing cycle of the system. Since the shut-off valve 87 senses the relative position between the pontoons 12 and 14, the orifice 77 should be sized in relationship to the orifice 79 so that the pontoons 12 and 14 move slower than the pontoons 19 and 21 during the closing operation. This insures that the pontoons 19 and 21 will be extended in their closed position before the panels 12 and 14 so that the hatch cover will be fully extended before unjacking commences.

The jacking mechanism is arranged so that the roller supporting links on both the truck assemblies and the jacking assemblies are in an over centered condition against stops when the hatch cover is in the open position of FIGURE 3. These stops are mounted on the body of the jacking assembly 18 as shown in detail in the patent to Lovell cited above. Therefore, the weight of the pontoons 12, 14, 19 and 21 serves to maintain the jacking system in the jacked position while the hatch covers are opened even though pressure is not maintained on the jacking system. This is an important consideration since the hatch covers remain open for a long period of time during the loading and unloading of a ship. It is therefore possible to shut off the hydraulic operating system when the hatch covers are open for an extended period of time and to re-energize the pressurizing system only when the hatch covers are to be operated.

It should be understood that even though the present invention has been illustrated in connection with a four pontoon hatch cover system, it is equally desirable on systems having greater or lesser numbers of pontoons, since it insures that proper jacking and actuating sequence will be provided with a single hydraulic control. This system also has an advantage in that it requires only two pressure lines to extend past the hinge 13 even though sequential operation of two separate phases is maintained at all times.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

What is claimed is:

1. In a hatch cover system comprising a plurality of pontoons connected for movement between extended and folded positions, and actuation means for moving said pontoons between said positions thereof; jacking means carried by the cover and being operative to raise and lower the pontoons, respectively, between a jacked condition in which the pontoons are supported by said jacking means and an unjacked condition in which such support is withdrawn, the pontoons being movable when thus jacked between the extended and folded positions of the cover, power means for operating said jacking means to raise and lower the pontoons, and control means for said power means having an operative connection with the pontoons and said power means such that the control means is actuated as a result of movement of the pontoons from the extended position of the same, with such control means when thus actuated being operative to prevent the power means from operating said jacking means from the jacked to the unjacked condition thereof.

2. In a hatch cover system comprising a plurality of pairs of pontoons connected for movement between extended and folded positions, and actuation means associated with each pair of pontoons for moving them between said extended and folded positions; jacking means carried by the cover and being operative to raise and lower the pontoons, respectively, between a jacked condition in which the pontoons are supported by said jacking means and an unjacked condition in which such support is withdrawn, the pontoons being movable when thus jacked between the extended and folded positions of the cover, power means for operating said jacking means to raise and lower the pontoons, first control means for said power means having an operative connection with one pair of the pontoons and said power means such that said first control means is actuated by movement of said one pair of pontoons from the extended position thereof, with such control means when thus actuated being operative to disable the power means from operating said jacking means from the jacked to the unjacked condition thereof, and the power means remaining so disabled until return of said one pair of pontoons to the extended position, and second control means for regulating the relative rate of movement of the pairs of pontoons so that said one pair is moved from other positions thereof to said extended position at a slower rate than the other of said pairs of pontoons.

3. In a hatch cover system comprising a plurality of pontoons connected for movement between extended and folded positions, and fluid pressure operated actuation means for moving said pontoons between said positions thereof; fluid pressure operated jacking means carried by the cover and being operative to raise and lower the pontoons, respectively, between a jacked condition in which the pontoons are supported by said jacking means and an unjacked condition in which such support is withdrawn, the pontoons being movable when thus jacked between the extended and folded positions of the cover, fluid supply means connected commonly and simultaneously to supply fluid under pressure to said actuation means and said jacking means, with said jacking means being operative by said fluid at a lower pressure than said actuation means, whereby the jacking means and actuation means are automatically sequentially operated in such order when the pontoons are in said extended position and the fluid under pressure is supplied thereto, and control valve means having an operative connection with said pontoons and jacking means, said control valve means being operated by movement of said pontoons from said extended position to prevent movement of said jacking means from the jacked to the unjacked condition of the same.

4. The hatch cover system as set forth in claim 3, wherein the hatch cover system comprises a plurality of pairs of pontoons connected for movement between said extended and folded positions, with said control valve means having an operative connection with one of said pairs of pontoons, and further control means for regulating the relative rate of movement of the pontoons such that said one pair moves from other positions to said extended position at a slower rate than the other of said pairs of pontoons.

5. In a hatch cover system comprising a plurality of pontoons connected for movement between extended and folded positions, and fluid pressure operated actuation means for moving said pontoons between said positions thereof; fluid pressure operated jacking means carried by the cover and being operative to raise and lower the pontoons, respectively, between a jacked condition in which the pontoons are supported by said jacking means and an unjacked condition in which such support is withdrawn, the pontoons being movable when thus jacked between the extended and folded positions of the cover, fluid supply means to supply fluid under pressure, a first pressure line from said supply means to said jacking means and actuation means operable when pressurized to operate the actuation means to move the pontoons from the extended to the folded position of the same and to move the jacking means from the unjacked to the jacked condition, a second pressure line from the supply means to said actuation and jacking means operable when pressurized to operate said actuation means to move the pontoons from the folded to the extended position of the cover and to move the jacking means from said jacked condition to said unjacked condition thereof, and control valve means having an operative connection with the pontoon and said jacking means being operated by movement of said pontoons away from said extended position, said control valve means when thus operated isolating said jacking means from said first pressure line when the pontoons are in any position other than the extended position thereof, with said jacking means being proportioned relative to the actuation means to operate at lower pressure than the latter, whereby the jacking means and the actuation means are automatically sequentially operated in such order when the pontoons are in the extended position and upon the common supply of fluid under pressure to the same.

References Cited in the file of this patent

UNITED STATES PATENTS

| | | |
|---|---|---|
| 2,770,297 | Mercier et al. | Nov. 13, 1956 |
| 2,791,095 | Mercier et al. | May 7, 1957 |
| 2,857,874 | McBride | Oct. 28, 1958 |
| 2,949,091 | Lovell | Aug. 16, 1960 |